July 31, 1951  J. H. TIMMER  2,562,285
GATE VALVE
Filed April 8, 1948

Inventor
Jan H. Timmer
By Robert E. Burns
Attorney

Patented July 31, 1951

2,562,285

UNITED STATES PATENT OFFICE 2,562,285

GATE VALVE

Jan H. Timmer, Hengelo, Netherlands, assignor to G. Dikkers & Co. N. V., Hengelo, Netherlands, a company of the Netherlands Application April 8, 1948, Serial No. 19,792
In the Netherlands April 16, 1947

1 Claim. (Cl. 251—159)

This invention relates to a sluice- or gate-valve, the wedge-shaped slide of which seals at both sides in its closed position on a seat in the casing and is guided in guides of the casing and operated by means of a spindle.

In order to enable the slide to adjust itself to deformations of the casing at varying temperature it has been proposed to provide the sealing faces of the slide on flexible flanges of the slide. In said known gate-valves the operating spindle is connected to said flexible flanges and the guide members cooperating with the guides in the casing are also provided on said flexible flanges, whereby the flexibility of the flanges is disturbed when the operating spindle is depressed and the clearance of the slide in its guides is affected by depressing the flexible flanges on their seats.

The invention has for its object to improve said known valves and to this end the flexible members form part of or are rigidly connected to a central part to which the operating spindle is connected and on which the guide members cooperating with the guides in the casing are provided. With said construction of the slide the flexible members are free to deflect without being affected by the pressure exerted by the operating spindle. Moreover the clearance of the slide in the guides in the casing is not influenced by the deflection of the flexible members so that said clearance in closed position of the slide has the same value as in open position. Since the spindle pressure does not disturb the flexibility of the flexible members it is possible to exactly calculate the deflection of said members for a certain seating pressure.

The flexible members of the slide may suitably be formed as truncated circular cones. With said construction of the slide the flexible members will uniformly deflect along their whole circumference and thus exert a uniformly distributed pressure on the seating faces. Morover the strain for a certain load will substantially be equal in all points of the sectional area of the flexible members so that the maximum deflection is obtained.

Figure 1:
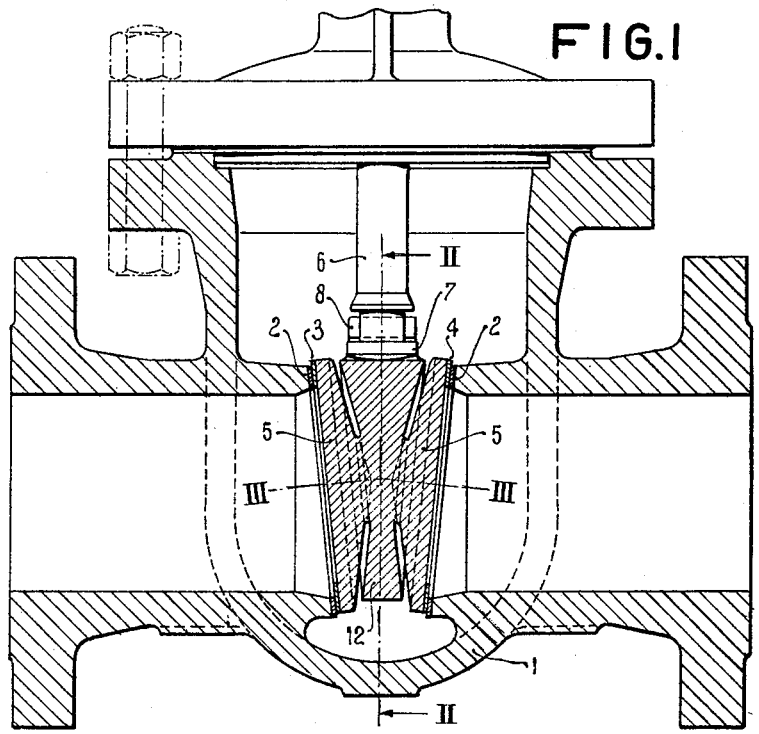
Figure 2:
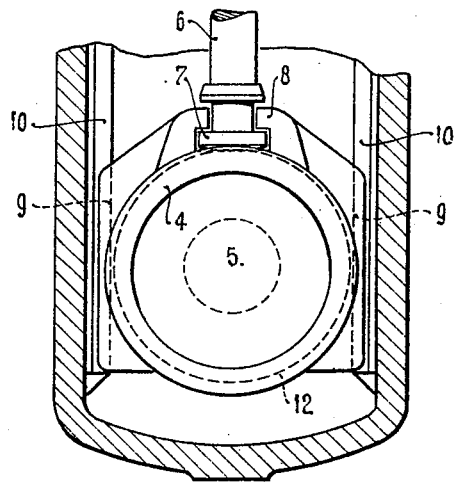
Figure 3:
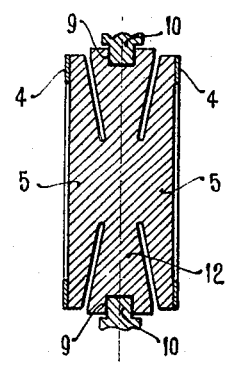

In order that the invention may be clearly understood the same will now be described with reference to the accompanying drawing, in which:

Fig. 1 is a sectional elevation of the valve casing showing the slide in its closed position, Fig. 2 is a part of a cross section on the line II—II of Fig. 1, and Fig. 3 a sectional plan view of the slide on the line III—III of Fig. 1.

In the example illustrated on the drawing the casing 1 is provided with hard metal seat rings 2 welded to the casing and cooperating with the slide 3 which has corresponding welded sealing faces 4. The slide 3 comprises a rigid central part 12 provided with two truncated conical flanges 5 carrying the sealing faces 4. The operating spindle 6 of the slide terminates in a collar 7 engaging below the hook shaped projections 8 provided on the central part 12 of the slide 3 so that the spindle actuates the central part. Said part 12 of the slide is further provided with two lateral grooves 9 by means of which the slide with a certain clearance is guided on ribs 10 projecting from the inner wall of the casing.

The lateral flanges 5 of the slide which are formed of separate pieces, may be welded to the central part 12 or otherwise rigidly connected to said latter in any suitable manner.

Since with the illustrated embodiment the flexible bodies 5 are connected to the central part 12 on a relatively small sectional area only in the center of the slide suitable flexibility of the bodies 5 is secured. With the slide according to the invention, therefore, sticking at variations of temperature is avoided, so that the slide is particularly adapted for highly superheated steam of 500° C. and more.

It is to be noted that the invention is not restricted to the illustrated example as several modifications may be made therein within the scope of the invention. Thus the sealing faces 2, 4 instead of being welded to the slide and the casing may also be connected thereto in other ways.

What I claim is:

A gate valve having a wedge shaped slide with a sealing face on each of its two inclined sides, each inclined side being in the form of a shallow truncated cone connected at its smaller end by welding with a central portion of the slide, an annular groove in truncated conical form separating a portion of the inclined side from the central portion of the slide, the groove extending along the truncated conical surface of the inclined side to a depth at least equal to the diameter of the area of connection between the inclined side and the central portion of the slide, the inclined side being flexible and being adapted to compensate by flexing for changes of angular position of the sealing face caused by contraction and expansion due to temperature changes, guiding means on the slide, a casing adapted to accommodate the slide, having guides to cooperate with the guiding means of the slide, sealing seats to cooperate with the sealing faces of the slide, and an operating spindle rigidly connected with the slide.

JAN H. TIMMER.

REFERENCES CITED

The following references are of record in the file of this patent:

UNITED STATES PATENTS

| Number | Name | Date |
|---|---|---|
| 1,786,295 | Ericsson | Dec. 23, 1930 |
| 2,195,923 | Hehemann | Apr. 2, 1940 |

FOREIGN PATENTS

| Number | Country | Date |
|---|---|---|
| 468,962 | Germany | Nov. 26, 1928 |